US012654777B2

(12) United States Patent
Park et al.

(10) Patent No.: US 12,654,777 B2
(45) Date of Patent: Jun. 16, 2026

(54) SIDE SILL FOR A VEHICLE

(71) Applicants: HYUNDAI MOTOR COMPANY, Seoul (KR); KIA CORPORATION, Seoul (KR)

(72) Inventors: Jun-Young Park, Seoul (KR); June-Beom Yong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 383 days.

(21) Appl. No.: 18/215,642

(22) Filed: Jun. 28, 2023

(65) Prior Publication Data

US 2024/0199126 A1     Jun. 20, 2024

(30) Foreign Application Priority Data

Dec. 14, 2022    (KR) ......................... 10-2022-0175231

(51) Int. Cl.
  *B62D 25/02* (2006.01)
  *B62D 21/15* (2006.01)

(52) U.S. Cl.
  CPC ......... *B62D 21/157* (2013.01); *B62D 25/025* (2013.01)

(58) Field of Classification Search
  CPC ............................ B62D 25/025; B62D 21/157
  USPC ........................................................ 296/209
  See application file for complete search history.

(56) References Cited

U.S. PATENT DOCUMENTS

| | | | | |
|---|---|---|---|---|
| 8,662,575 B2 * | 3/2014 | Tamura | .................. | B62D 25/04 |
| | | | | 296/209 |
| 2012/0274099 A1 * | 11/2012 | Tamura | .................. | B62D 25/04 |
| | | | | 296/193.06 |
| 2015/0129116 A1 * | 5/2015 | Richeton | ................ | B60J 5/0444 |
| | | | | 293/120 |
| 2019/0256150 A1 * | 8/2019 | Cooper | ................ | B62D 21/155 |
| 2021/0078642 A1 * | 3/2021 | Grattan | ................ | B62D 25/04 |
| 2021/0162940 A1 * | 6/2021 | Sonobe | ................ | B62D 25/08 |
| 2021/0179180 A1 * | 6/2021 | Lee | ........................ | B62D 27/026 |
| 2021/0245810 A1 * | 8/2021 | Walker | ................... | B62D 21/15 |
| 2021/0371012 A1 * | 12/2021 | Limousin | ............. | B62D 21/157 |
| 2022/0212720 A1 * | 7/2022 | Oxley | ................. | B62D 25/025 |
| 2022/0289300 A1 * | 9/2022 | Kim | ....................... | B62D 21/15 |
| 2022/0363318 A1 * | 11/2022 | Bodin | ................... | B62D 25/00 |
| 2023/0016200 A1 * | 1/2023 | Matsui | ................ | B62D 29/007 |
| 2023/0373566 A1 * | 11/2023 | Kuroda | ............... | B62D 27/023 |
| 2024/0199126 A1 * | 6/2024 | Park | ..................... | B62D 25/025 |
| 2025/0065955 A1 * | 2/2025 | Ito | ........................ | B62D 25/025 |
| 2025/0196928 A1 * | 6/2025 | Hirano | ................ | B62D 21/157 |
| 2025/0236339 A1 * | 7/2025 | Chikita | ................. | B62D 25/20 |
| 2025/0242866 A1 * | 7/2025 | Ageba | .................. | B62D 25/025 |

FOREIGN PATENT DOCUMENTS

KR          970051616 U     9/1997

* cited by examiner

*Primary Examiner* — Gregory A Blankenship
(74) *Attorney, Agent, or Firm* — Lempia Summerfield Katz LLC

(57) ABSTRACT

A side sill for a vehicle including a side sill inner part and a side sill outer part having upper portions and lower portions bonded to each other. The side sill further includes a support member that is bonded to an inner surface of the side sill outer part and that is formed in cross section to be bent toward an inside of the vehicle at one or more places in a height direction of the vehicle.

19 Claims, 13 Drawing Sheets

SIDE SILL FOR A VEHICLE

CROSS-REFERENCE TO RELATED APPLICATION

This application claims priority to Korean Patent Application No. 10-2022-0175231, filed on Dec. 14, 2022, which is incorporated herein by reference in its entirety.

BACKGROUND OF THE DISCLOSURE

Field of the Disclosure

The present disclosure relates to a side sill for a vehicle forming a lower portion of a side surface structure of the vehicle, and more specifically, to a side sill for a vehicle capable of preventing entry into an interior of the vehicle caused by rotation in the event of a side collision.

Description of Related Art

A side sill disposed on a lower portion of a side surface of a vehicle in a longitudinal direction of the vehicle serves as a lower portion of a side surface structure of the vehicle.

As shown in FIGS. 1 and 2, the side sill has a side sill inner part 111 and a side sill outer part 112 having upper portions and lower portions bonded to each other by welding or the like. The side sill outer part 112 is bonded to a side sill outer panel 113 exposed to the outside of the side sill outer part 112.

The side sill 110 is bonded to a lower end of a center pillar 141 extending downward from a roof of the vehicle. The side sill inner part 111 is bonded to a side end of a floor panel 142 and a lower portion of the side sill inner part 111 is fastened to a battery mounting bracket 145 to which a battery of an electric vehicle is mounted. A front end of the side sill 110 is connected to the front pillar 143.

The side sill 110 supports collision energy in the event of a side collision to maintain a shape of a passenger cabin or interior, thereby reducing injuries to occupants. Since an impact absorption space in the event of the side collision of the vehicle is smaller than in the event of a collision of the vehicle in a front-rear direction, the side sill needs to have a robust structure.

To this end, an aluminum extruding member or a multi-lip 120 is inserted into the side sill 110 so that the side sill 110 becomes the robust structure. However, there is a problem in that the aluminum extruding member is costly and the multi-lip 120 may not sufficiently support the impact energy applied in the event of the side collision.

In particular, recently, the spread of electric vehicles has been expanding, and the aerodynamic performance of the electric vehicles needs to be improved to increase electricity consumption efficiency. As a part of the improvement in aerodynamic performance, the ground clearance is reduced to improve the aerodynamic performance, thereby increasing electricity consumption efficiency.

However, since the side sill 110 is also lowered as the ground clearance is lowered or reduced, an impact point in the event of the side collision is higher than the side sill 110. This results in a behavior in which a lower end of the center pillar 141 is hit during a collision.

According to such an impact aspect, when an object, such as a barrier B, hits a lower portion of the center pillar 141 from an upper portion of the side sill 110 during a side collision test, a phenomenon occurs that the lower portion of the center pillar 141 is broken or significantly damaged, and the upper portion of the side sill 110 rotates and enters into the interior of the vehicle. Accordingly, there is a problem in that survival space of the occupant is reduced.

SUMMARY OF THE DISCLOSURE

The present disclosure has been conceived to solve the above-mentioned problems and is directed to providing a side sill for a vehicle. The disclosed side sill reduces an amount of a side sill that has been rotated by an impact to enter an interior of the vehicle in the event of a side collision, thereby reducing injuries to occupants.

In order to achieve the objects, a side sill for a vehicle includes a side sill inner part and a side sill outer part having upper portions and lower portions bonded to each other. The side sill further includes a support member that is bonded to an inner surface of the side sill outer part and that is formed in a cross section being bent toward an inside of the vehicle at one or more places in a height direction of the vehicle.

The support member includes: an upper surface portion bonded to an inner upper portion of the side sill outer part; a side surface portion extending downward from the upper surface portion and bonded to a vertical surface of the side sill outer part, a reinforcing portion bent from the side surface portion and positioned to be spaced apart from the vertical surface of the side sill outer part; a connection portion connecting the side surface portion and the reinforcing portion; and a lower surface portion bonded to an inner lower portion of the side sill outer part.

In one embodiment, the support member has the upper surface portion, the side surface portion, and the lower surface portion bonded to the inner surface of the side sill outer part by welding.

In one embodiment, a ratio of a distance from the side surface portion to the reinforcing portion to a distance from the side surface portion to an end of the upper surface portion or the lower surface portion is formed at a predetermined ratio.

In one embodiment, the support member is welded to the side sill outer part and a center pillar reinforce.

In one embodiment, an angle between the side surface portion and the connection portion is an obtuse angle.

In one embodiment, a plurality of reinforcing portions is formed at intervals in the height direction of the vehicle, and each reinforcing portion is connected to the side surface portion by the connection portion.

In one embodiment, the plurality of reinforcing portions is spaced the same distance from the vertical surface of the side sill outer part.

In one embodiment, the plurality of side surface portions is formed at the same height.

In one embodiment, the support member further includes an extension that extends from the upper surface portion toward the side sill inner part at a front end of the support member. A flange portion extends upward from the extension and is bonded to the side sill inner part.

In one embodiment, the side sill further includes a multi-lip part that is bonded to an inner upper surface and lower surface of the side sill inner part and has an outer end of the vehicle positioned inside the support member.

In one embodiment, a concave portion is concave toward an inner surface of the vehicle on an outer surface of the vehicle and is formed in the multi-lip part.

In one embodiment, the reinforcing portion of the support member is positioned between an upper end and a lower end of the concave portion of the multi-lip part.

In one embodiment, the concave portion is formed in some sections of the multi-lip part in a longitudinal direction of the vehicle.

In one embodiment, the support member is manufactured by roll forming.

According to the side sill according to the present disclosure having the above configuration, by additionally providing the support member having a curved cross section inside the side sill, it is possible to reduce the rotation of the side sill in the event of the side collision.

It is also possible to reduce the degree to which the side sill enters the interior of the vehicle when the side sill is rotated in the event of a side collision Injuries to the occupants may thereby be reduced in the event of a side collision.

In particular, by supporting the energy applied in the event of a side collision, even without using an expensive aluminum extruded member, it is possible to reduce the deformation of the side sill.

In addition, as the support member forms the load path through which the collision load is transmitted rearward from the front of the vehicle in the event of the collision in the front-rear direction, by connecting the front end of the support member to the front side member, it is possible to absorb the collision energy against the collision of the vehicle in the longitudinal direction.

DESCRIPTION OF SPECIFIC EMBODIMENTS

Figure 1:
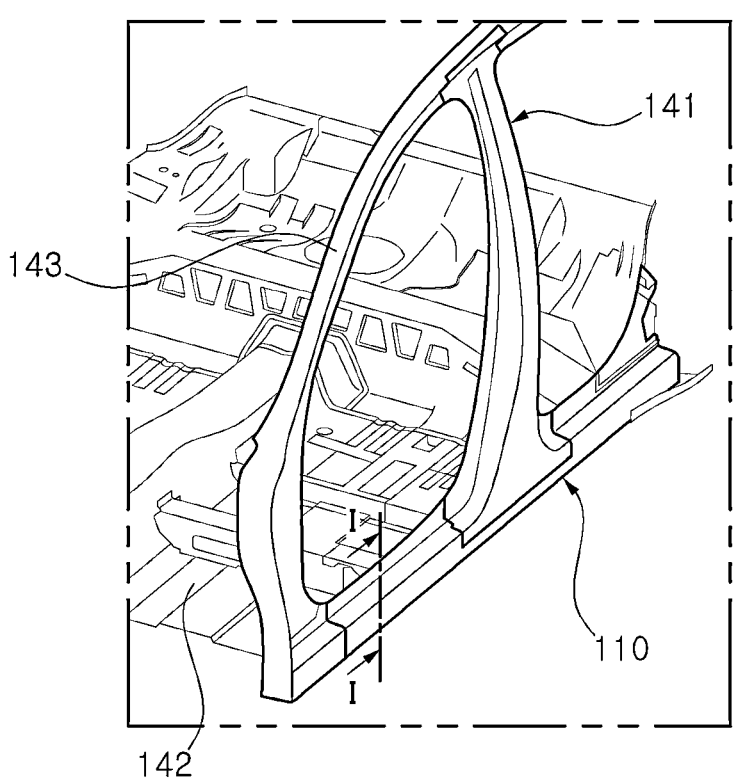
FIG. 1 is a perspective view showing a side surface structure of a vehicle to which a side sill according to the related art is applied.
Figure 2:
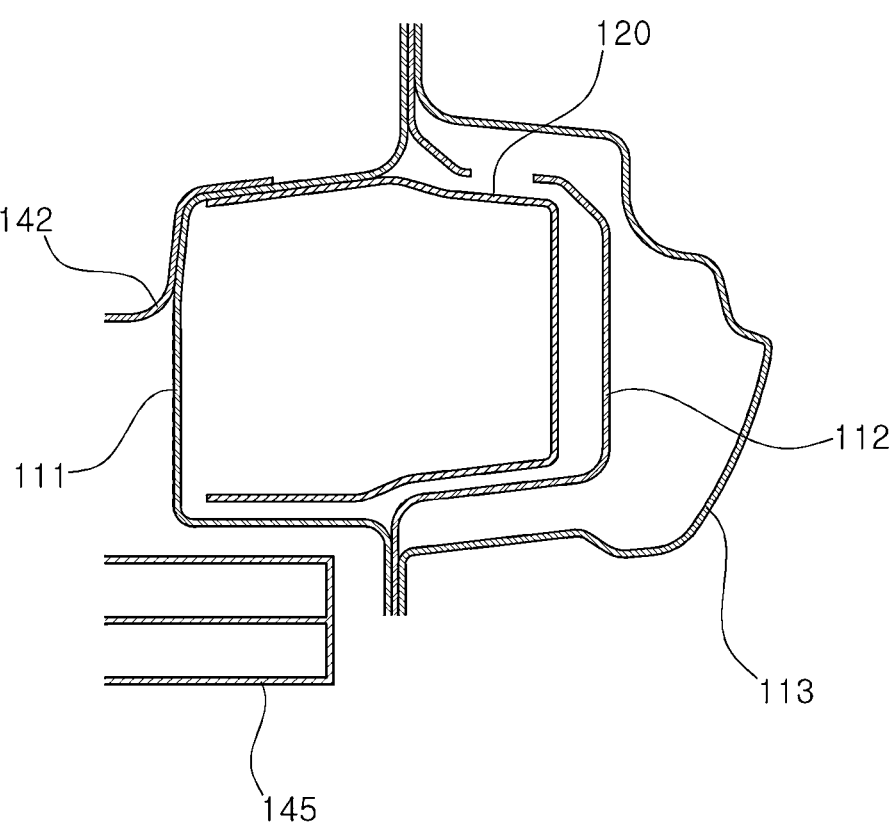
FIG. 2 is a cross-sectional view along line I-I in FIG. 1.

Hereinafter, some embodiments of the present disclosure are described in detail with reference to the accompanying drawings. In the following description, like reference numerals designate like elements, although the elements are shown in different drawings. Further, in the following description of some embodiments, a detailed description of known functions and configurations incorporated therein has been omitted for the purpose of clarity and for brevity. When a component, device, element, unit, or the like of the present disclosure is described as having a purpose or performing an operation, function, or the like, the component, device, element, or unit should be considered herein as being "configured to" meet that purpose or to perform that operation or function.

Hereinafter, a side sill for a vehicle according to the present disclosure is described in detail with reference to the accompanying drawings.

The side sill for a vehicle according to the present disclosure includes a side sill inner part 11 and a side sill outer part 12 having upper portions and lower portions bonded to each other. The side sill further includes a support member 30 bonded to an inner surface of the side sill outer part 12 and formed to have a cross section bent toward an inside of the vehicle at one or more places in a height direction of the vehicle.

The side sill 10 forms a lower portion of a side surface structure of the vehicle and has the side sill inner part 11 concavely formed toward the inside of the vehicle and the side sill outer 12 convexly formed toward an outside of the vehicle, when viewed from the outside of the vehicle as a reference. The upper portions and the lower portions of the side sill parts 11 and 12 are bonded to each other. The side sill outer part 12 is bonded to a side sill outer panel 13 exposed to the outside of the side sill outer part 12.

The side sill inner part 11 is bonded to an end of a floor panel 42. A battery mounting bracket 45 to which a battery of an electric vehicle is mounted is fastened to a lower portion of the side sill inner part 11.

In addition, a multi-lip part 20 is provided and is bonded to each of an inner upper surface and lower surface of the side sill inner part 11 and has an outer end positioned on the side sill outer part 12.

Figure 3:
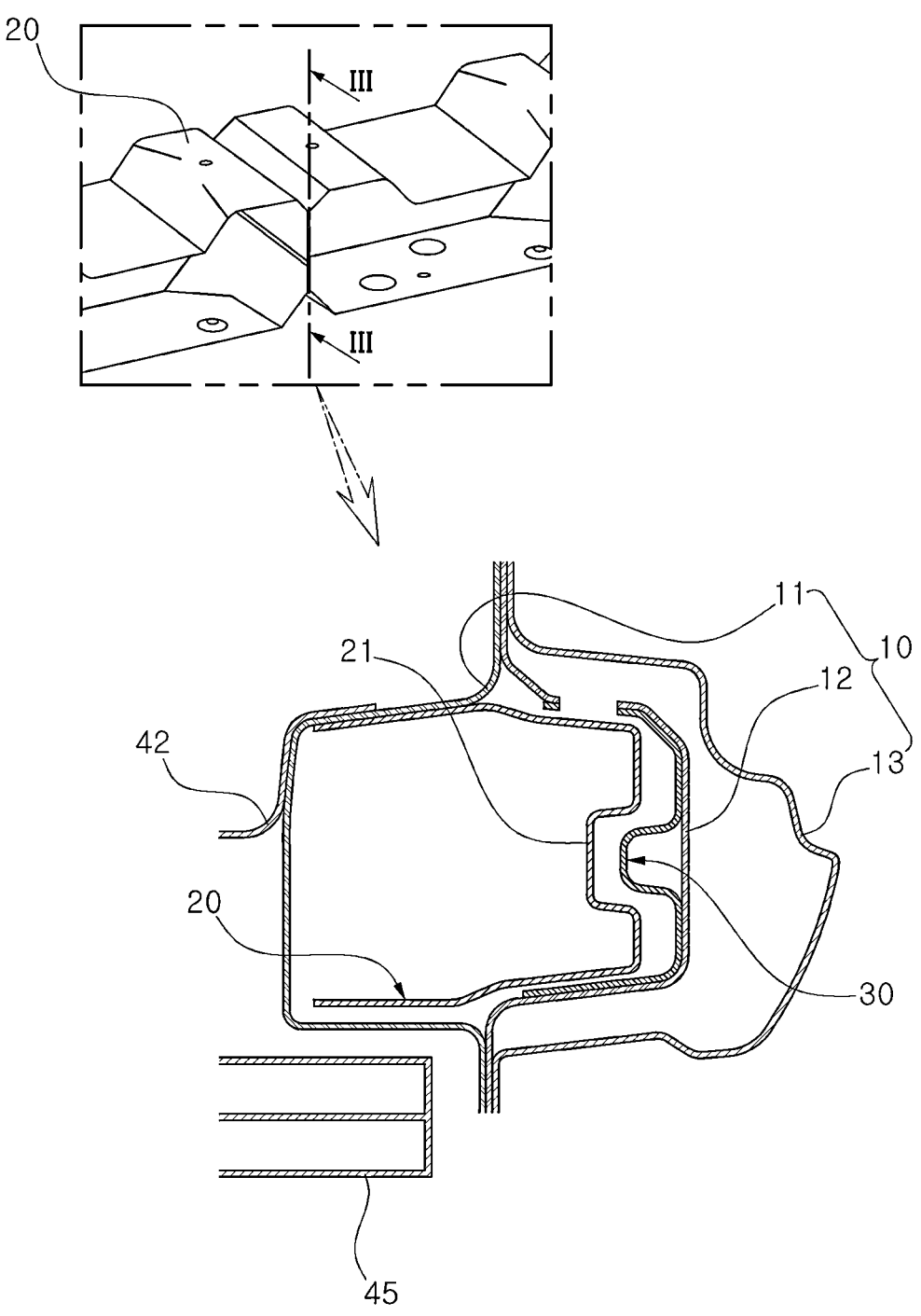
FIGS. 3 and 4 are cross-sectional views showing a side sill for a vehicle according to the present disclosure.

A concave portion 21 is concavely formed toward an inner surface of the vehicle on the outer surface of the multi-lip part 20 and is formed in a partial section of the multi-lip part 20 (see FIG. 3). The concave portion 21 is not formed in the remaining section of the multi-lip 20 part (see FIG. 4).

In particular, in the present disclosure, the support member 30 is additionally provided between the multi-lip part 20 and the side sill outer part 12 so that the support member 30 increases the stiffness between the multi-lip part 20 and the side sill 10.

The support member 30 is bonded to the inner surface of the side sill outer part 12 and is formed to have the cross section that is bent toward the inside of the vehicle at one or more places in the height direction of the vehicle so as to become the member providing stiffness.

Figure 5:
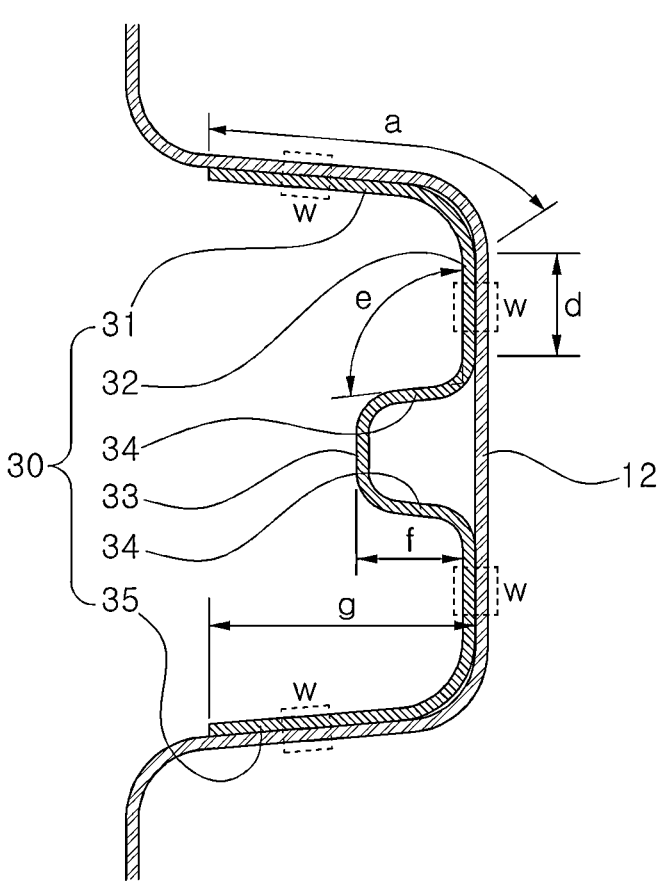
FIG. 5 is a cross-sectional view showing a state in which a support member is bonded to a side sill outer part in the side sill for a vehicle according to the present disclosure.

As shown in FIG. 5, the support member 30 includes an upper surface portion 31 bonded to an inner upper portion of the side sill outer part 12. The support member 30 also has a side surface portion 32 extending downward from the upper surface portion 31 and bonded to a vertical surface of the side sill outer part 12. The support member 30 also has a reinforcing portion 33 bent from the side surface portion 32 and positioned to be spaced apart from the vertical surface of the side sill outer part 12. The support member 30 also has a connection portion 34 connecting the side surface portion 32 and the reinforcing portion 33. The support member 30 also has a lower surface portion 35 bonded to an inner lower portion of the side sill outer part 12.

The support member 30 is bonded to the inner surface of the side sill outer part 12 through welding W.

The support member 30 has a bent shape in cross section that is bent to form the reinforcing portion 33 and the connection portions 34 to support a collision load in the event of the side collision of the vehicle. The side sill 10 when rotated during a side collision is thereby prevented from entering into the interior.

The support member 30 is formed of a metal sheet, for example, a steel plate through a roll forming process. A bent cross section like the reinforcing portion 33 and the connection portion 34 is formed of the metal sheet through the roll forming process.

The support member 30 has the upper surface portion 31, the side surface portion 32, and the lower surface portion 35 bonded to the side sill outer part 12 by the welding W.

In order to specify the shape of the support member 30, criteria for determining shapes of the upper surface portion 31, the side surface portion 32, the reinforcing portion 33, the connection portion 34, and the lower surface portion 35 are as follows.

As shown by "a" in FIG. 5, a surface of the support member 30 that may be welded W to the side sill outer part 12 is selected. A surface of the upper surface portion 31 to be welded to the side sill outer part 12 is shown in FIG. 5. Surfaces of the side surface portion 32 and the lower surface portion 35 that may be welded W to the side sill outer part 12 are also shown.

The upper surface portion 31 is spaced a predetermined distance from an end thereof and welded to the side sill outer part 12. As described above, the section of the upper surface portion 31 indicated by "a" is selected as the section in which welding is possible, but it is difficult for the upper surface portion 31 to be bonded to the side sill outer 12 at the end of the upper surface portion 31. Also, the entry of a welding gun T (see FIG. 6) is impossible in some sections.

Figure 6:
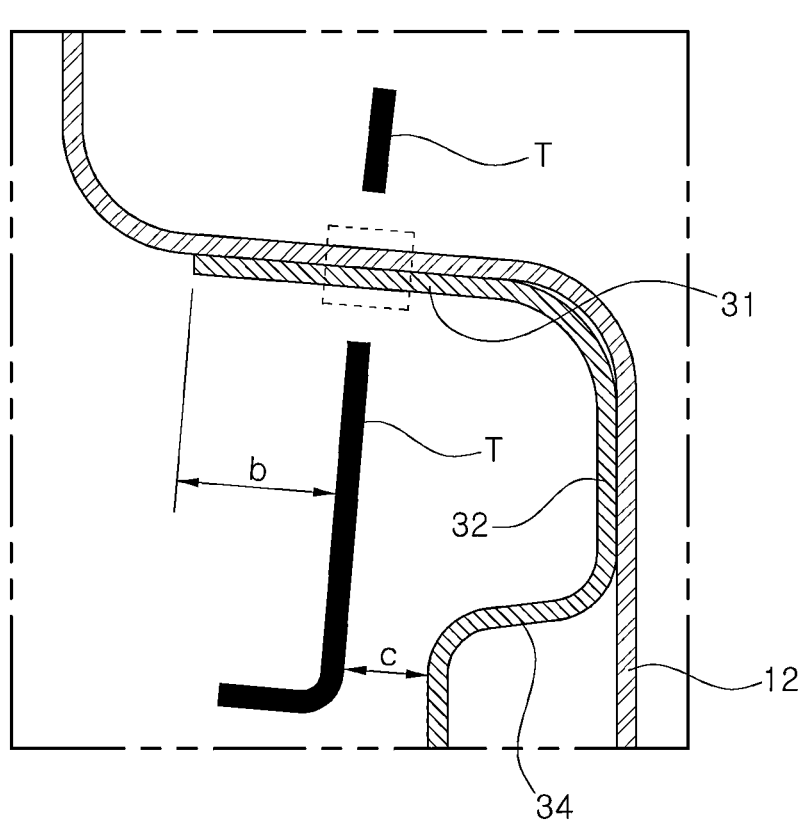
FIG. 6 is a cross-sectional view showing a process of bonding an upper surface portion of a support member to a side sill outer part in the side sill for a vehicle according to the present disclosure.

Accordingly, the upper surface portion 31 is welded to the side sill outer part 12 at a position spaced a predetermined distance from the end of the upper surface portion 31. FIG. 6 shows that the upper surface portion 31 is welded to the side sill outer part 12 at a position spaced "b" from the end of the upper surface portion 31. In addition, the welding gun T performs welding in a state spaced a predetermined distance or more from the inside of the support member 30, i.e., the reinforcing portion 33. In FIG. 6, the welding gun T enters at a position spaced "c" from the reinforcing portion 33 to bond the upper surface portion 31 and the side sill outer part 12. For example, the upper surface portions 31 may be welded to the side sill outer part 12 at a position spaced 6 mm or more from the end of the upper surface portion 31. The welding gun T may enter in a state of being spaced 5 mm from the reinforcing portion 33.

This is also applied to a case in which the lower surface portion 35 is bonded to the side sill outer part 12 because the support member 30 is formed symmetrically in a vertical direction.

Meanwhile, an angle between the side surface portion 32 and the connection portion 34 shown as "e" in FIG. 5 is formed as an obtuse angle. This angle has considered moldability and is for facilitating discharge after molding the support member 30. Since the reinforcing portion 33 is parallel to the side surface portion 32, an angle between the reinforcing portion 33 and the connection portion 34 is also formed to be the same as the angle between the side surface portion 32 and the connection portion 34.

As shown by "d" in FIG. 5, the side surface portion 32 is bonded to the side sill outer part 12 at a predetermined width or more in a height direction of the vehicle. For example, the side surface portion 32 is welded to the inner surface of the side sill outer part 12 by 15 mm or more.

A ratio (f/g) of a distance f from the side surface portion 32 to the reinforcing portion 33 to a distance g from the side surface portion 32 to the end of the upper surface portion 31 or the lower surface portion 35 is formed at a predetermined ratio. As the ratio increases, a section modulus increases and a stable cross section having an increasing bending strength (flexural stiffness) is formed. Thus, the ratio is selected as a maximum value in consideration of molding capability and assembly capability. For example, the ratio may be in a range of 0.4 to 0.6.

The support member 30 is welded to the side sill outer part 12 and a center pillar reinforcement 41 at a middle portion of the side sill 10 in the longitudinal direction of the vehicle.

Figure 7:
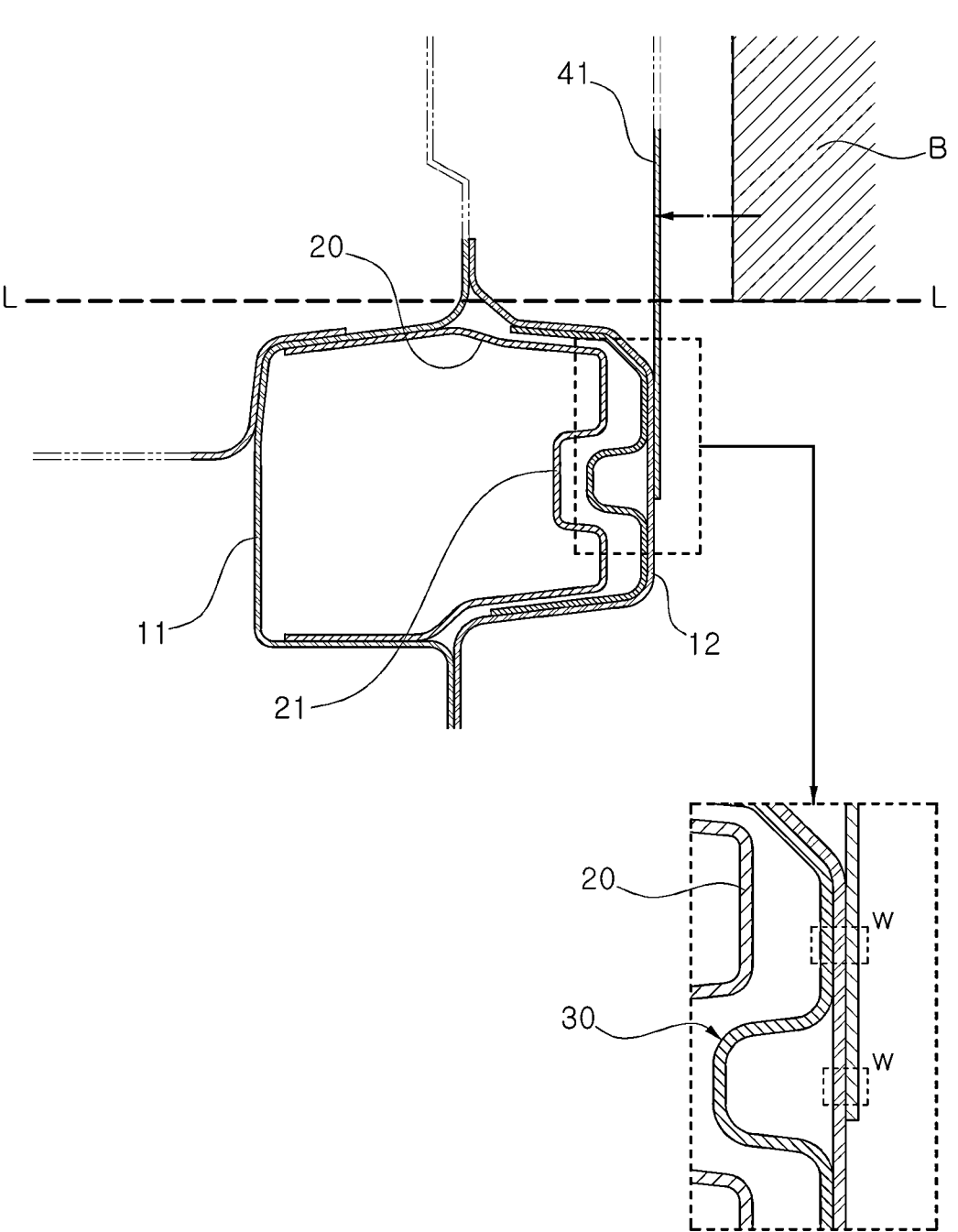
FIG. 7 is a cross-sectional view showing a state immediately before a crash test barrier strikes the side sill for a vehicle according to the present disclosure.

As shown in a lower portion of FIG. 7, the side surface portion 32 of the support member 30 is welded W with the side sill outer part 12 and the center pillar reinforcement 41 at three points. The side sill outer part 12 and the center pillar reinforcement 41 are welded W at two points in a region in which the side surface portion 32 is not formed.

The reinforcing portion 33 is positioned between an upper end and a lower end of the concave portion 21 of the multi-lip part 20 when viewed in the height direction of the vehicle. Since the reinforcing portion 33 is positioned between the upper end and the lower end of the concave portion 21, the reinforcing portion 33 is caught by the concave portion 21 in the event of the side collision to restrain the behavior of the support member 30, thereby preventing the rotation of the side sill 10.

Figure 8:
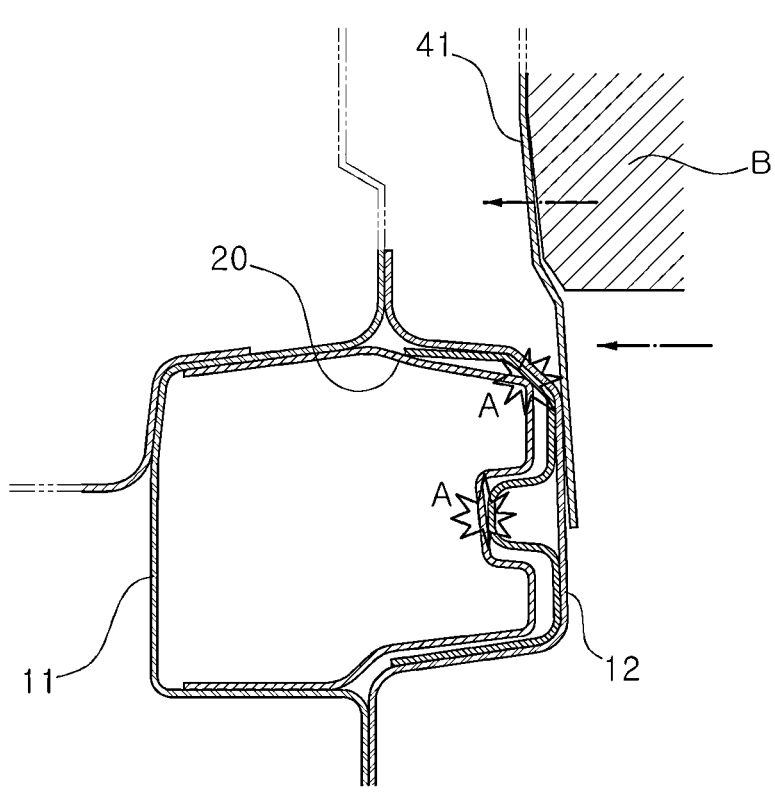
FIG. 8 is a cross-sectional view showing a state in which the crash test barrier has hit the side sill for a vehicle according to the present disclosure.
Figure 9:
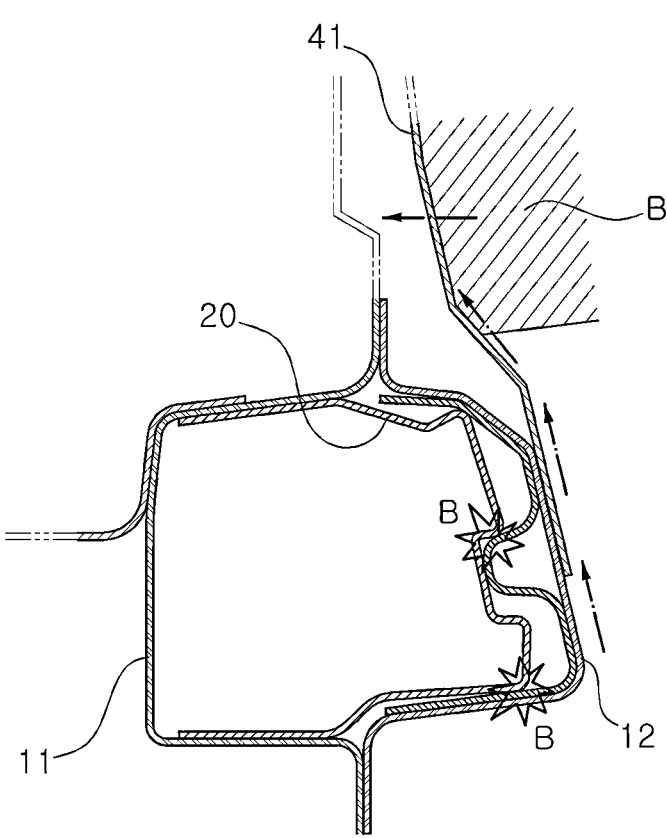
FIG. 9 is a cross-sectional view showing a state in which the crash test barrier strikes the side sill for a vehicle according to the present disclosure.

FIGS. 7-9 show states when a crash test barrier B strikes the side sill 10 at a portion in which the concave portion 21 is formed.

FIG. 7 shows a state just before the barrier B hits the side surface of the vehicle. FIG. 8 shows an initial state in which the barrier B hits the side surface of the vehicle. FIG. 9 shows a state in which the barrier B has fully hit or impacted the side surface of the vehicle.

When the barrier B hits higher than the side sill 10, conventionally, the barrier B hits the lower end of the center pillar and breaks the lower end of the center pillar. Thus, the side sill rotates and enters into the interior space of the vehicle.

However, in the present disclosure, even when the barrier B strikes higher than or above a height (line L-L) at which the side sill 10 is installed, the support member 30 supports the collision load to prevent the rotation of the side sill 10. The side sill 10 and the lower end of the center pillar are thus prevented from entering the interior space of the vehicle.

As shown in FIG. 8, the collision load of the barrier B is transmitted to the upper portion of the side sill 10 in the entry direction (arrow direction in FIG. 8) of the barrier B at the beginning or initial impact of the barrier B. The upper surface portion 31 and the reinforcing portion 33 of the support member 30 are caught by the upper end of the multi-lip part 20 and the concave portion 21, thereby primarily preventing a phenomenon that the side sill 10 is pushed toward the interior of the vehicle.

Thereafter, deformation occurs in which the center pillar including the center pillar reinforcement 41 is pushed toward the inside of the vehicle. A behavior occurs in which the center pillar drags the side sill 10 and enters the inside of the vehicle.

When the barrier B continues to impact and impinge the center pillar reinforcement 41, as shown in FIG. 9, the behavior of the center pillar dragging the side sill 10 and entering the inside of the vehicle causes a load moving the side sill 10 up (see an arrow in FIG. 9). However, each of the reinforcing portion 33 and the lower surface portion 35 of the support member 30 are caught by the lower end of the concave portion 21 of the multi-lip part 20, thereby preventing the rotation of the side sill 10.

Accordingly, it is possible to prevent or minimize the entry of the side sill 10 into the interior of the vehicle.

In this process, since the collision energy of the barrier B is extinguished and the entry of the barrier B is prevented, it is possible to minimize the entry of the side sill 10, thereby sufficiently securing the survival space of the occupant.

Figure 4:
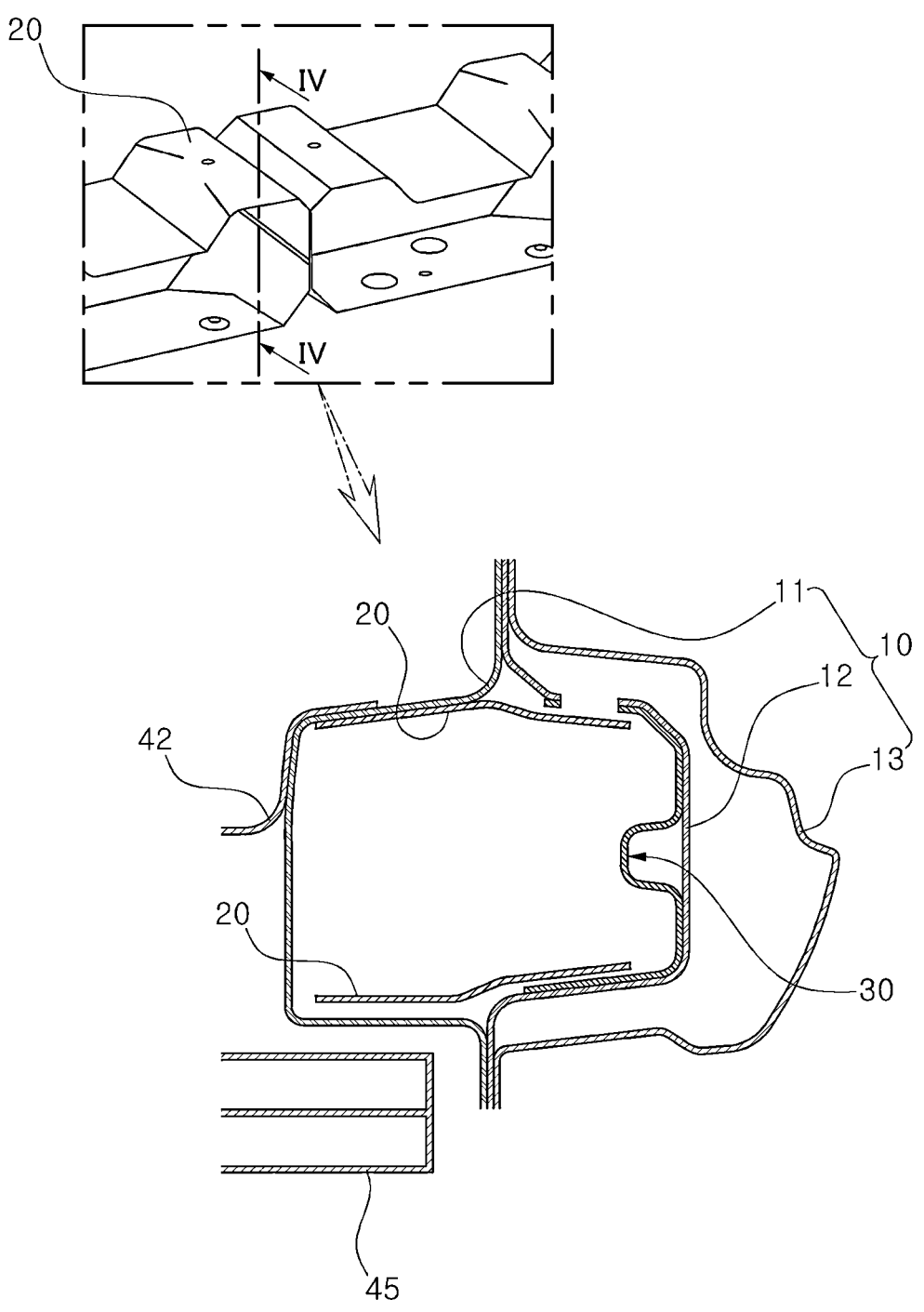

Meanwhile, as shown in FIG. 4, the upper surface portion 31 of the support member 30 is caught by the upper end of the multi-lip part 20, even at a portion in which the concave portion 21 is not formed, at the beginning of the collision, thereby preventing the side sill 10 from being pushed toward the interior of the vehicle. In addition, when the impact further proceeds, the lower surface portion 35 of the support member 30 is caught by the lower end of the multi-lip part 20, thereby preventing the rotation of the side sill 10.

Figure 10:
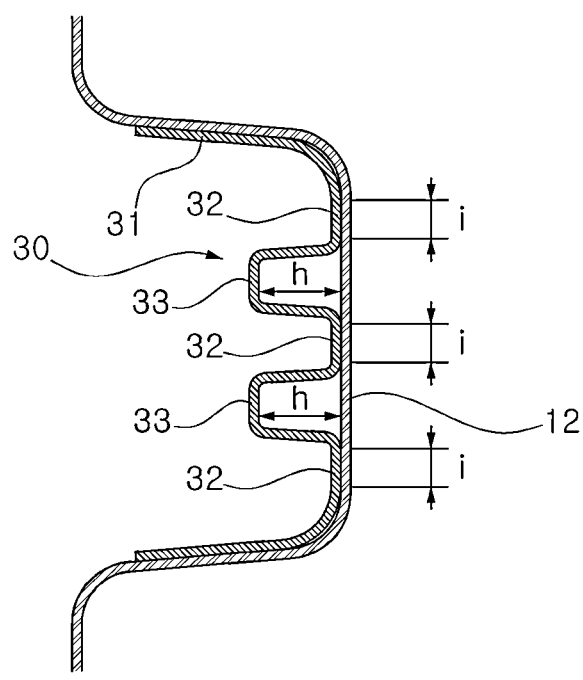
FIG. 10 is a cross-sectional view of a side sill for a vehicle according to another embodiment of the present disclosure.

As shown in FIG. 10, a plurality of reinforcing portions 33 may be formed at intervals in the height direction of the vehicle.

Each of the reinforcing portions 33 are all connected to the side surface portion 32 through the respective connection portions 34.

In this case, the plurality of reinforcing portions 33 are formed to be spaced the same distance from the vertical surface of the side sill outer part 12. In FIG. 10, the reinforcing portions 33 are formed at positions spaced "h" from the vertical surface of the side sill outer part 12.

In addition, a plurality of side surface portions 32 are divided and formed as the reinforcing portion 33 are formed and are formed having the same height as each other. FIG. 10 shows an example in which each of the side surface portions 32 is at a height "i"

When the height of the side sill 10 increases, the number of reinforcing portions 33 and the number of side surface portions 32 may be increased rather than increasing the heights of the reinforcing portions 33 and the side surface portions 32. This may increase the section modulus, thereby increasing the bending strength of the support member 30.

Figure 11:
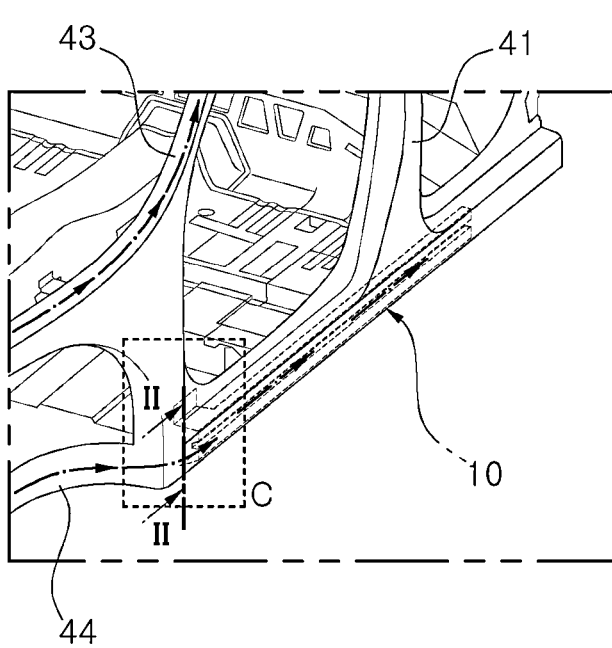
FIG. 11 is a perspective view showing a state in which the side sill for a vehicle according to another embodiment of the present disclosure is mounted inside the side sill.
Figure 12:
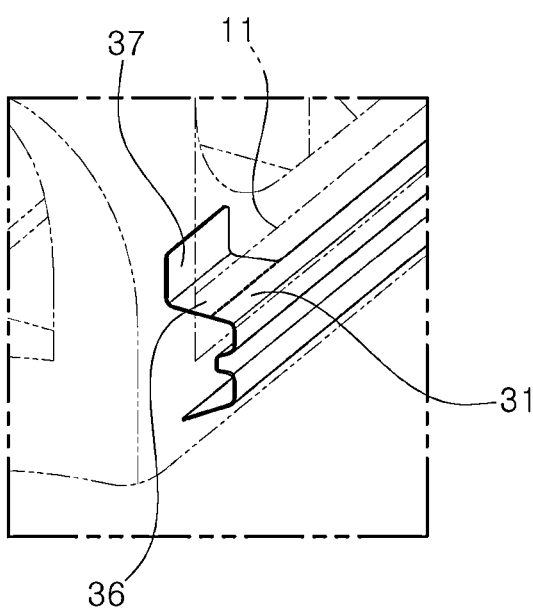
FIG. 12 is an enlarged perspective view of portion C in FIG. 11.
Figure 13:
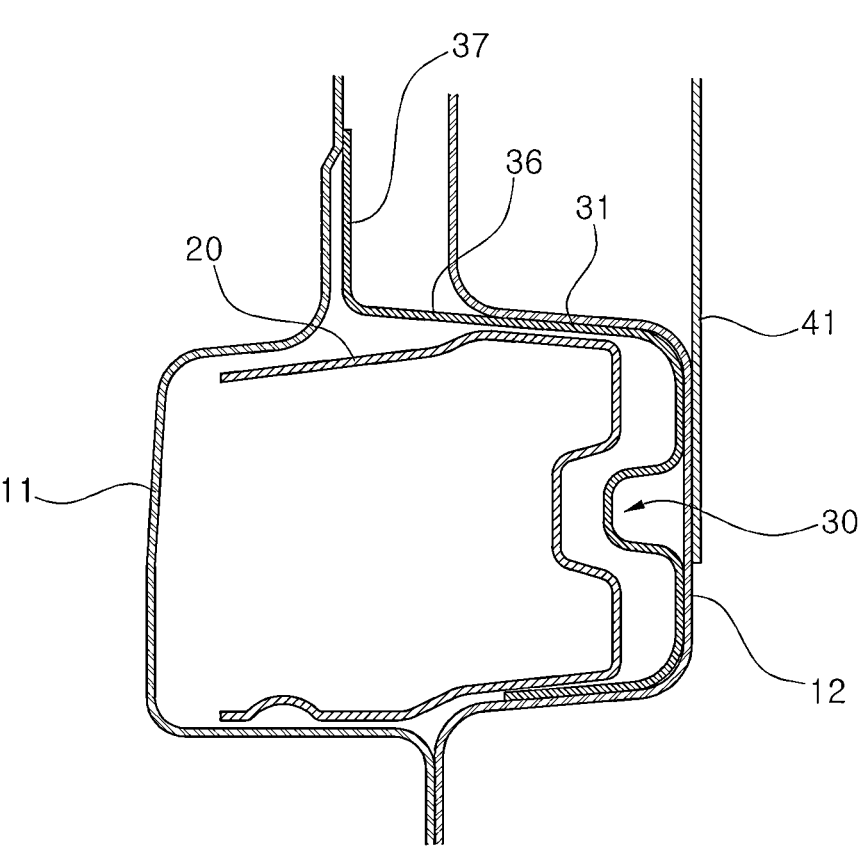
FIG. 13 is a cross-sectional view along line II-II in FIG. 11.

Meanwhile, the support member 30 may extend upward from the front end of the support member 30 so that the support member 30 is bonded to the upper portion of the side sill inner part 11, as shown in FIGS. 11-13.

The support member 30 may further include an extension 36 extending from the upper surface portion 31 toward the side sill inner 11 at the front end of the support member 30 and a flange portion 37 extending upward from the extension 36 and bonded to the side sill inner part 11. The flange portion 37 is directly fastened to the upper portion of the side sill inner part 11 by bolts or the like.

Since the side sill inner part 11 and the side sill outer part 12 are not connected at the front end of the side sill 10, target performance may not be provided during a frontal collision test (particularly, a small overlap test).

However, the flange portion 37 is fastened to the side sill inner part 11 so that the side sill inner part 11 and the support member 30 are directly connected.

Accordingly, as shown in FIGS. 11-13, since a load path transmitted to the upper portion of the side surface through a front pillar 43 and a load path through a front side member

44 and the support member 30 are formed in the event of the frontal collision, it is also possible to improve the frontal collision performance.

In the above description, it should be understood that the described embodiments may be implemented in many different ways. Although embodiments of the present disclosure have been described for illustrative purposes, those of ordinary skill in the art should appreciate that various modifications, additions, and substitutions are possible, without departing from the idea and scope of the appended claims. Therefore, embodiments of the present disclosure have been described for the sake of brevity and clarity. The scope of the technical idea of the present embodiments is not limited by the illustrations. Accordingly, one of ordinary skill would understand that the scope of the appended claims is not to be limited by the above explicitly described embodiments but by the claims and equivalents thereof.

What is claimed is:

1. A side sill for a vehicle, the side sill comprising:
a side sill inner part and a side sill outer part having upper portions and lower portions bonded to each other; and
a support member bonded to an inner surface of the side sill outer part and formed in cross section to be bent toward an inside of the vehicle at one or more places in a height direction of the vehicle,
wherein the support member includes
an upper surface portion bonded to an inner upper portion of the side sill outer part,
an extension that extends from the upper surface portion toward the side sill inner part at a front end of the support member, and
a flange portion extending upward from the extension and bonded to the side sill inner part.

2. The side sill of claim 1, wherein the support member further includes:
a side surface portion extending downward from the upper surface portion and bonded to a vertical surface of the side sill outer part;
a reinforcing portion bent from the side surface portion and positioned to be spaced apart from the vertical surface of the side sill outer part;
a connection portion connecting the side surface portion and the reinforcing portion; and
a lower surface portion bonded to an inner lower portion of the side sill outer part.

3. The side sill of claim 2, wherein the support member has the upper surface portion, the side surface portion, and the lower surface portion bonded to the inner surface of the side sill outer part by welding.

4. The side sill of claim 3, wherein a ratio of a distance from the side surface portion to the reinforcing portion to a distance from the side surface portion to an end of the upper surface portion or the lower surface portion is a predetermined ratio.

5. The side sill of claim 2, wherein the support member is welded to the side sill outer part and a center pillar reinforcement.

6. The side sill of claim 2, wherein an angle between the side surface portion and the connection portion is an obtuse angle.

7. The side sill of claim 2, wherein a plurality of reinforcing portions is formed at intervals in the height direction of the vehicle, and wherein each reinforcing portion is connected to the side surface portion by the connection portion.

8. The side sill of claim 7, wherein the plurality of reinforcing portions is spaced the same distance from the vertical surface of the side sill outer part.

9. The side sill of claim 7, wherein the side surface portion includes a plurality of the side surface portions, each having the same height.

10. The side sill of claim 2, further comprising a multi-lip part that is bonded to an inner upper surface and lower surface of the side sill inner part and has an outer end positioned inside the support member.

11. The side sill of claim 10, wherein a concave portion is concavely formed in the multi-lip part toward an inner surface of the vehicle on an outer surface of the multi-lip part.

12. The side sill of claim 11, wherein the reinforcing portion of the support member is positioned between an upper end and a lower end of the concave portion of the multi-lip part.

13. The side sill of claim 11, wherein the concave portion is formed in some sections of the multi-lip part in a longitudinal direction of the vehicle.

14. The side sill of claim 1, wherein the support member is manufactured by roll forming.

15. A side sill for a vehicle, the side sill comprising:
a side sill inner part and a side sill outer part having upper portions and lower portions bonded to each other;
a support member bonded to an inner surface of the side sill outer part and formed in cross section to be bent toward an inside of the vehicle at one or more places in a height direction of the vehicle; and a multi-lip part that is bonded to an inner upper surface and lower surface of the side sill inner part and that has an outer end positioned inside the support member.

16. The side sill of claim 15, wherein the support member comprises:
an upper surface portion bonded to an inner upper portion of the side sill outer part;
a side surface portion extending downward from the upper surface portion and bonded to a vertical surface of the side sill outer part;
a reinforcing portion bent from the side surface portion and positioned to be spaced apart from the vertical surface of the side sill outer part;
a connection portion connecting the side surface portion and the reinforcing portion; and
a lower surface portion bonded to an inner lower portion of the side sill outer part.

17. The side sill of claim 15, wherein a concave portion is concavely formed in the multi-lip part toward an inner surface of the vehicle on an outer surface of the multi-lip part.

18. The side sill of claim 17, wherein the reinforcing portion of the support member is positioned between an upper end and a lower end of the concave portion of the multi-lip part.

19. The side sill of claim 17, wherein the concave portion is formed in some sections of the multi-lip part in a longitudinal direction of the vehicle.

* * * * *